Patented July 6, 1937

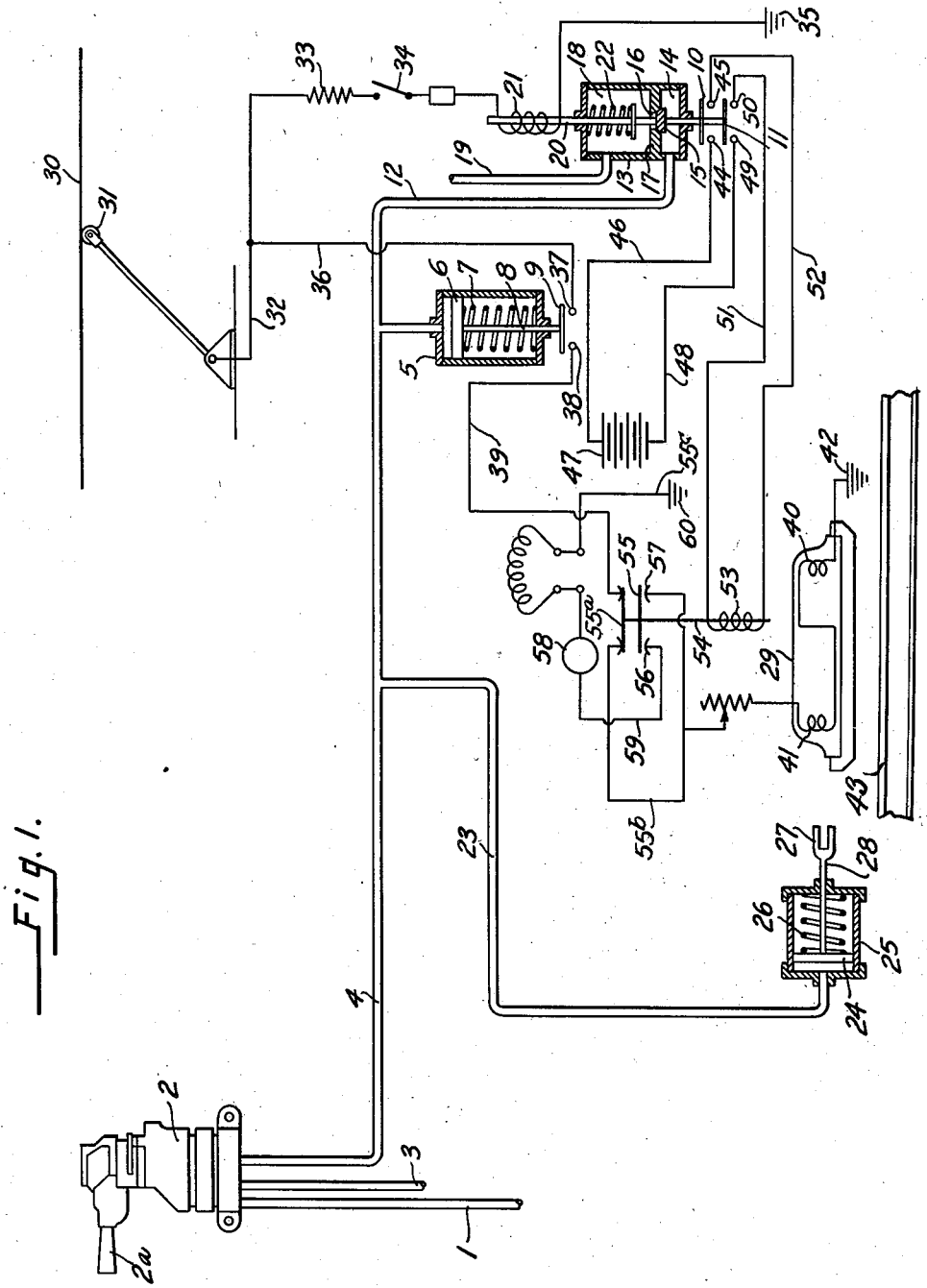

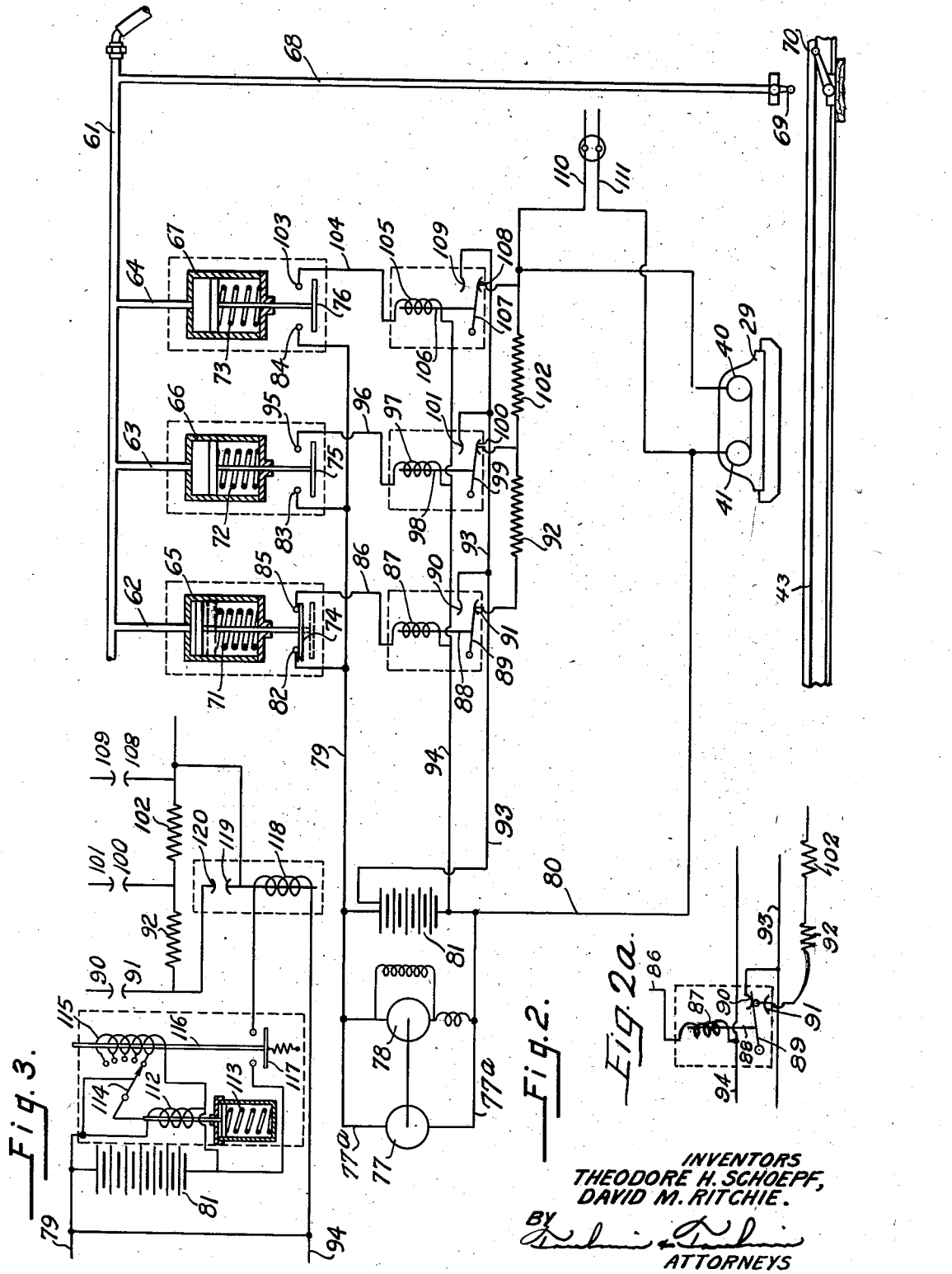

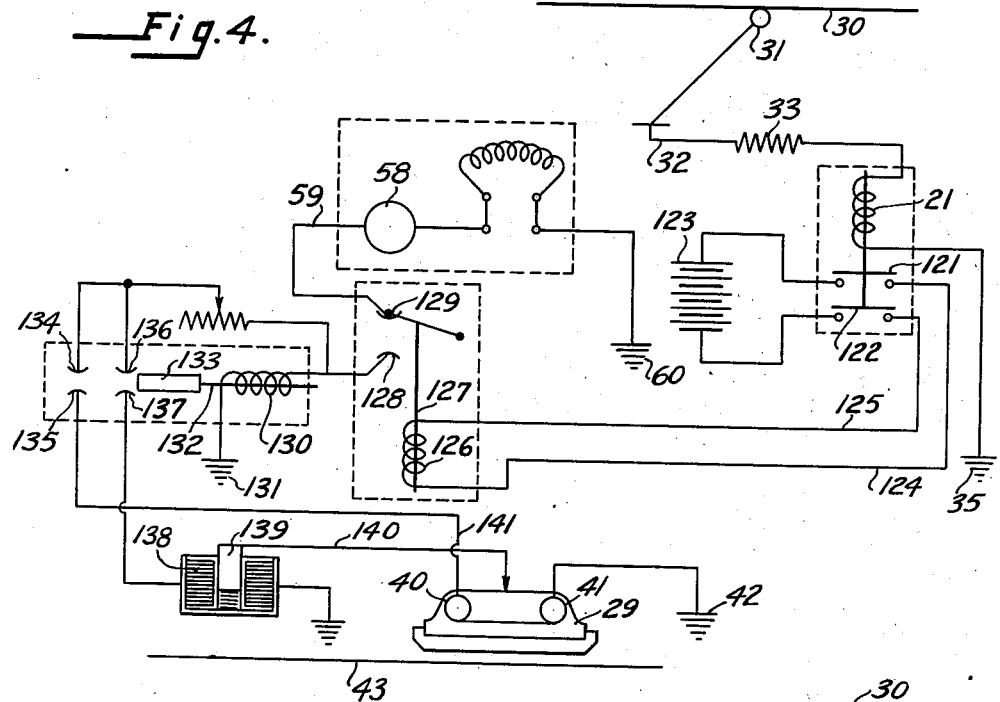
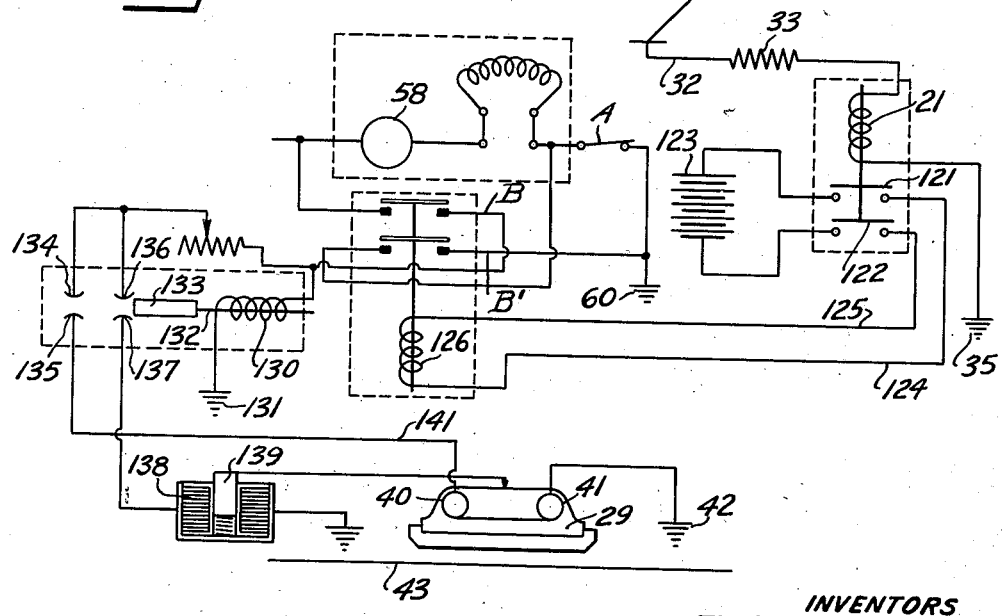

2,086,177

UNITED STATES PATENT OFFICE 2,086,177

MAGNETIC BRAKE

Theodore H. Schoepf and David M. Ritchie, Cincinnati, Ohio, assignors to The Cincinnati Traction Building Company, Cincinnati, Ohio, a corporation of Ohio Application January 7, 1935, Serial No. 680

17 Claims. (Cl. 303—3)

Our invention relates to an apparatus for the application and energization of magnetic brakes.

In particular, it is our object to provide a system of applying and magnetizing magnetic brakes and progressively increasing the magnetization thereof.

It is our object to provide a system in which, upon a failure or disruption of the electrical power source being used to drive the car on which the brakes are located, the brakes will be connected to a source of electrical power comprising the driving motors and the regenerative energy from those motors will be used to actuate and energize the magnetic brakes to simultaneously slow the motors, slow down the car and apply the brakes.

Referring to the drawings:

Figure 1 is a diagrammatic view, partially in section, showing the use of a no-voltage relay for controlling the application of an air-actuated switch and an air-actuated means for bringing the magnetic brake into braking position, the brake being energized by the regenerative current from the driving motor acting as a generator;

Figure 2 is a diagrammatic view of a similar arrangement employing a battery in conjunction with a generator for progressively applying the energization of the brake. This system may be used in conjunction with Figure 1 optionally. Figure 2 also shows the air line for actuation of the braking system;

Figure 2a is a detail elevation of one of the switches shown elevated or lifted by the solenoid to make contact with a branch of the lower battery line in order to cut in two adjacent resistance coils;

Figure 3 is a diagrammatic view illustrating the use of a battery as a substitution for the motor generator of Figure 2;

Figure 4 is a diagrammatic view showing the battery energy of the circuit closed by the no-voltage relay for connecting the driving motor as a regenerative generator for supplying current to electrically apply and energize the magnetic brake;

Figure 5 is a similar view showing a modified form of electrical connections.

Referring to the drawings and in particular to Figure 1, 1 is an air supply line to a controller 2 which is provided with an air exhaust 3. The air is supplied under pressure through the pipe 4 to a switch closing valve 5 which has a piston 6, spring 7 and a piston rod 8. The piston rod 8 carries switch blade 9, the function of which will be hereinafter explained in connection with the electric circuit. The pipe 12 supplies air to the no-voltage air valve 13 into the chamber 14 below the valve 15 controlling the port 16. This port is located in the partition 17 separating the chamber 14 from the chamber 18. The chamber 18 is provided with a supply line 19. The valve stem 20 also passes through it and constitutes the solenoid core with a no-voltage relay 21. A spring 22 normally tends to open the valve 15 and will open the valve when the no-voltage relay 21 is deenergized.

The branch air pipe 23 is used for actuating a wheel brake applying piston 24 in the cylinder 25. The air operates against the spring 26. The yoke 27 on the piston rod 28 is connected to the magnetic brake shoe 29 for either applying it to the rail or preferably moving it from a safe position into a position to be energized adjacent to but out of contact with the rail.

Electric circuit of Figure 1

A source of electrical energy, such as the trolley wire 30, supplies current through the trolley wheel and pole generally designated 31 to the line 32 and thence through the resistance 33, switch 34 to the no-voltage relay 21 and thence to ground at 35. It also supplies current through the line 36 to the terminal 37 which is connected by the switch blade 9 to the terminal 38 and line 39. The line 39 leads to the magnetizing coils 40 and 41 of the brake shoe 29. These coils are connected together and to the ground 42. This completes the brake energization circuit. Thus, when the air is applied in normal operation by operating the controller handle 2a, the switch valve 5 is actuated and the brake is put into energization position and energized and drawn against the rail which is designated as 43.

In the event, however, that the trolley wheel 31 leaves the wire 30, then the no-voltage relay 21 is deenergized. In such an event, the spring 22 opens the valve 15 so that air from the line 19 will pass through the line 12 and actuate the valve 5. When it does so, it closes the switch blade 10 across the terminals 44 and 45 thus connecting the wire 46 which, in turn, is connected to the battery 47 and to the wire 48. The switch blade 11 connects the terminals 49 and 50 to complete the circuit through the wires 51 and 52, the wires 48 and 52 containing the solenoid coil 53, the core of which 54 carries a switch blade 55 and, upon being so energized, connects the terminals 56 and 57.

When this is done, the motor 58 is connected by the line 59 in circuit with the energization coils 40 and 41 of the brake shoe 29 to energize the shoe. In the meantime, the air from the line 19 is passed through the valve 5, pipe 4, pipe 23 to the applying valve 25 and brings the brake into braking position. The motor 58 is connected permanently to the ground 60 which completes the circuit.

Thus, in Figure 1, in normal operation, the magnetic brake may be applied and energized by using the air to bring it into braking position and to close the circuit connecting the brake for energization with the power line 30. In the event of an emergency when the connection of the power line 30 is disrupted, the air will serve to connect the brake for energization to the driving motor acting as a generator, and the air will also bring the brake into braking position.

The sequence of operations is as follows: If the power fails, it would permit spring 22, due to deenergization of the solenoid 21, to close the switch 10 across the terminals 44 and 45, and 49 and 50, cutting the battery 47 in circuit. This battery energizes the solenoid 53 to move the switch 55 across the terminals 56, 57. This cuts in the motor circuit with the motor 58 connecting it to the brake shoe. As the car is traveling the motor is being turned over because of its connection with the car wheels and is then acting as a generator supplying current to the brake shoe to energize it. A third power source is constituted of the battery 47 in Figure 1 of the drawings.

We will here trace the circuit by which electrical energy passes from the main power source 30 to the traction motor 58. The current passes from the trolley wire through the trolley 31, the wire 32, the wire 36, to the switch 9 (which when the motorman starts the train and operates the main air line 4 by turning the valve handle 2a, will make switch 9 contact with the terminals 37 and 38) and thence along the wire 39, across the switch 55a to the line 55b through the terminal 57 and switch 55 to terminal 56, thence into the line 59 and to the traction motor 58. From the motor the current passes through the ground line 55c grounded at 60.

Thus the traction motor is simply shown to be connected with the main power line when that line is intact. If the line becomes disordered, then the traction motor 58, being rotated because the train is then moving, will act as a generator and perform the function of energizing the brake shoe. This is done through the line 59, terminal 56, switch 55, terminal 57, thence through the coil 41, then through the coil 40 and grounded at 42.

*Emergency air application*

Referring to Figures 2 and 3, there will be seen in these figures an arrangement by which the same principle of using the motor as a source of regenerative energy for brake energization is employed but it is used in conjunction with an emergency air line which becomes operative on the brake system upon a decrease in pressure either through disruption of the main power circuit which opens the emergency air valve, such as a conductor valve, or upon the opening of the line by an external trip as shown in Figure 2. The emergency air line 61 supplies air through the branches 62, 63 and 64 to the switch valves 65, 66 and 67. The line 68 has a trip valve 69 which may be opened by the external trip along the track 70. Upon the release of the air in the emergency line 61, then the springs 71, 72 and 73 will successively operate as they are of different strengths and will move the switch blades 74, 75 and 76 into engaging position with their respective terminals.

77 designates a motor and 78 a generator for which may be substituted the driving motor of the car, the energy from which when acting as a generator will be utilized for the same purpose. This motor generator set or the motor acting as a generator is connected on one side to the line 79 and on the other side to the line 80. Across these two lines is connected a battery 81. To this battery the motor is electrically connected by lines 77a, 77a. The line 79 has a plurality of terminals 82, 83 and 84. Terminal 82 is connected by the switch 74 to the terminal 85 connected to the line 86 having the solenoid coil 87, the core of which 88 is connected with a switch 89. When this solenoid is energized, its switch blade 89 is brought against the terminal 90 and lifts the terminal 91 so as to cut in the resistances 92 and 102, as seen in Fig. 2a. The terminal 90 is connected to the line 93 which in turn is connected to the battery 81 as seen in Fig. 2. The other side of the battery is connected to the line 94 and to the solenoid coil 87.

The switch blade 75 likewise joins the terminals 83 and 95. The terminal 95 is in the line 96 having the solenoid coil 97 actuating the core 98, switch 99 for breaking the contact with the terminal 100 making contact with the terminal 101 and thence to the wire 93, thereby cutting out of circuit the resistance 102.

Likewise, switch 76 connects the terminal 84 to the terminal 103, line 104, solenoid 105, which actuates the core 106 to move the switch blade 107 from the terminal 108 to the terminal 109 in the line 93 thereby bringing the brake 29 with its coils 40 and 41 in circuit for energization. The brake may be drawn to the rail when so energized or may be positioned when in energized position by an air operating means, such as shown in Figure 1.

In operation, the spring 73 is the weakest of the three springs and will, therefore, have its circuit closed first for energizing the brake and thereafter the energization increases by the operation of the next stronger spring 72 which cuts out the resistance 102 and the final operation of the spring 71 which cuts out the resistance 92 and the full energization of the brake takes place. Jumper lines 110 and 111 are used to connect the electrical system on one car to another in the event the motor generator set or driving motors are on one car only.

It will be understood that the battery 1 is a primary source of brake energization in this arrangement but that it is supplied with current either from the motor generator set or from the generator or the traction motor acting as a generator.

In the event that the battery should be too weak for proper energization of the brake shoes and, at the same time, use the resistances 92 and 102, the arrangement in Figure 3 is for the purpose of cutting out these resistances and applying the full force of the battery directly.

When the battery 81 drops below a predetermined point, which makes it desirable to apply the current from the battery directly to the brake shoe without going through the resistances 92 and 102, then the solenoid 112 will have an insufficient amount of energy to overcome the spring 113 and the switch 114 will connect in the coils 115 of the solenoid and actuate the core 116 thereof to close the switch 117 and thereby connect the solenoid 118 so as to close the terminals 119 and 120 so that current from the battery will be promptly applied to the energization coils 40 and 41.

The spring 113 tends to pull the core of the solenoid 112 downwardly. When the battery is strong, this downward pull is resisted by the energization of the coil 112 by the battery. But if the battery is weak, the spring 113 overcomes the pull of coil 112 and thereby moves the contact finger 114 to include a greater number of coils of the solenoid 115 thereby closing the switch 117, energizing the solenoid 118, closing the contacts 119 and 120 and connecting the shoes and circuit without the resistances.

Referring to Figure 4, when the main power line 30 is disrupted, the solenoid 21 is deenergized and the switch blades 121 and 122 connect the battery 123 through lines 124 and 125 to the solenoid 126 to actuate its core 127 so as to bring the terminals 128 and 129 into engagement with one another. This connects the traction motor 50 and the energy it is supplying when acting as a generator to the solenoid 130 which is grounded at 131 thereby actuating its core 132 and switch blade 133 to close the contacts 134 and 135, and 136 and 137 respectively.

By closing these contacts, the traction motor acting as a generator supplies current for energizing the solenoid 138, whose core 139 acting through a lever 140 moves the brake 29 into braking position and likewise the traction motor acting as a generator is connected by the line 141 to the coils 40 and 41 of the brake to energize the brake.

Figure 5 shows a modification of the foregoing arrangement. In Fig. 5, a switch A, of the hand-operated type, is used to open the grounding line, while in Fig. 4 no such switch is employed. In Fig. 5, there is added a double switch B, B', the lower of which, B', will restore or close the grounding line, when the switch A is open.

The continued movement of the car after the disconnection of the main power source from the motor causes the traction motor to act as a generator of electrical power.

It will be understood that we desire to comprehend within our invention such modifications as may be necessary to adapt it to varying conditions and uses.

Having thus fully described our invention, what we claim as new and desire to secure by Letters Patent, is:—

1. In a magnetic track braking system, a magnetic brake, a main power source for driving a car carrying the brake, a traction motor for driving the car supplied by the main power source, means for normally connecting the brake for energization by the main power source, and means upon the failure of the main power source by disruption for connecting the traction motor acting as a generator to the magnetic brake to energize it.

2. In a magnetic track braking system, a magnetic brake, a main power source for driving a car carrying the brake, a traction motor for driving the car supplied by the main power source, means for normally connecting the brake for energization by the main power source, and means upon the failure of the main power source by disruption for connecting the traction motor acting as a generator to the magnetic brake to energize it and apply it.

3. In a magnetic braking system, a main power source, a motor for driving the car connected thereto, a magnetic brake, means to energize the brake, means to apply the brake, and means upon the failure of the main power source for applying and energizing the brake by connecting it to the traction motor acting as a generator.

4. In a magnetic braking system, a main power source, a motor for driving the car connected thereto, a magnetic brake, means to energize the brake, means to apply the brake, means upon the failure of the main power source for applying and energizing the brake by connecting it to the traction motor acting as a generator, and air means for effecting the connection between the brake and motor upon the failure of the main source of electrical energy.

5. In a magnetic brake system, a magnetic brake, air means for positioning the brake and for connecting it to one of several sources of electrical energy for energizing it, a main power source for driving the car carrying the brake and for energizing the brake, a traction motor for driving the car adapted to act as a generator upon the continued movement of the car after the disconnection of the main power source from the motor and, when so acting, constituting one of the sources of electrical energy for energizing the magnetic brake.

6. In a magnetic brake system, a magnetic brake, air means for positioning the brake and for connecting it to one of several sources of electrical energy for energizing it, a main power source for driving the car carrying the brake and for energizing the brake, a traction motor for driving the car adapted to act as a generator upon the continued movement of the car after the disconnection of the main power source from the motor and, when so acting, constituting one of the sources of electrical energy for energizing the magnetic brake, and air-operated means for applying the brake.

7. In combination, in a magnetic brake system of a magnetic brake, a source of air pressure, manual means of applying said air pressure for applying the brake and connecting the brake to a source of electrical energy, a traction motor to drive the car carrying the brake, a main power source for actuating the motor and energizing the brake, and means upon the failure of the main power source for automatically applying the air means for applying the brake and energizing it by connecting it to the traction motor then acting as a generator.

8. In combination, in a magnetic brake system, a source of air supply, a manual controller therefor, an electrically-actuated controller therefor operative upon the failure of the main power source, a main power source for energizing a magnetic brake and for driving a traction motor, a magnetic brake, a traction motor, an air-operated switch for connecting said magnetic brake, for energizing it, to either said main power source or said traction motor acting as a generator when the main power source fails.

9. In combination, in a magnetic brake system, a source of air supply, a manual controller therefor, an electrically-actuated controller therefor operative upon the failure of the main power source, a main power source for energizing a magnetic brake and for driving a traction motor, a magnetic brake, a traction motor, an air-operated switch for connecting said magnetic brake, for energizing it, to either said main power source or said traction motor acting as a generator when the main power source fails, and a third power source connected by said air operated switch for effecting the electrical connection between the motor and the magnetic brake.

10. In a magnetic track brake system, a source of air and a manual controller therefor, a source of electricity and an air controller operated thereby, a common air operated switch, a magnetic brake, means for applying said brake by said air, and means of energizing said brake from the source of electricity, a traction motor operated by said source of electricity adapted, upon the failure of the source of electricity, to act as a secondary source of electricity for energizing the magnetic brake.

11. In a magnetic brake system, a magnetic brake, electrical means for energizing the brake, electrical means for positioning the brake to apply it, a main power source for energizing the brake and supplying a traction motor, a traction motor, electrically operated means, upon the failure of the main power source, for connecting the traction motor as a generator for supplying current to apply and energize the magnetic brake.

12. In combination, a magnetic brake, a main electrical source, a no-voltage relay held inoperative thereby, a traction motor driven thereby, a battery and a battery circuit adapted to be connected in operative position upon the failure of the main electrical source, and means operated by the battery for connecting the traction motor so as to apply and energize the magnetic brake, said traction motor, upon the failure of the main electrical source, acting as a generator.

13. In combination, in a magnetic brake system, of a main source of electrical energy, a traction motor supplied thereby, a magnetic brake, and means upon the failure of the main source of electrical energy for connecting the traction motor for use as a generator for applying and energizing the magnetic brake.

14. In a magnetic brake system, a main source of electrical energy, a no-voltage relay held inoperative thereby, a battery circuit and battery adapted to be rendered inoperative upon the failure of the main electrical supply, a traction motor supplied by the main electrical supply, a solenoid switch controlled by said battery circuit for connecting the traction motor to a magnetic brake, a magnetic brake, electrical means for applying said brake, and switch means controlled by said battery circuit for connecting said traction motor acting as a generator to electrically apply and energize said magnetic brake.

15. In a magnetic brake system, a main power circuit, a no-voltage relay switch therein, a battery and battery circuit adapted to be closed thereby, a motor adapted to act as a generator and its circuit, a magnetic brake, an energy circuit therefore, an applying circuit therefor, a solenoid switch for closing said circuits and connecting them to a source of electrical energy such as the motor circuit, and a solenoid switch in the battery circuit adapted to connect said motor circuit and the solenoid switch for closing the brake applying and energizing circuits.

16. In combination, in a magnetic track brake system, an emergency air line, a magnetic brake, means of applying the brake upon the failure of pressure in the emergency air line, and means of energizing the brake upon the failure of pressure in the emergency air line, said means comprising a source of electrical energy and a succession of sequentially operated switches adapted to progressively increase the energization of the magnetic track brake.

17. In combination, in a magnetic track brake system, an emergency air line, a magnetic brake, means of applying the brake upon the failure of pressure in the emergency air line, means of energizing the brake upon the failure of pressure in the emergency air line, said means comprising a source of electrical energy and a succession of sequentially operated switches adapted to progressively increase the energization of the magnetic track brake, and means upon the reduction of the amount of current flowing from the source of electrical energy of cutting out a portion of said switches.

THEODORE H. SCHOEPF.
DAVID M. RITCHIE.